United States Patent
Ichikawa et al.

(10) Patent No.: US 6,621,661 B1
(45) Date of Patent: Sep. 16, 2003

(54) WRITE/READ HEAD SUPPORTING MECHANISM INCLUDING A MICROACTUATOR AND A SLIDER CONNECTED TO A GROUND REGION OF A SUSPENSION

(75) Inventors: Shinji Ichikawa, Tokyo (JP); Yoshikazu Soeno, Tokyo (JP); Takamitsu Tsuna, Tokyo (JP)

(73) Assignee: TDK Corporation, Tokyo (JP)

( * ) Notice: Subject to any disclaimer, the term of this patent is extended or adjusted under 35 U.S.C. 154(b) by 78 days.

(21) Appl. No.: 09/615,776

(22) Filed: Jul. 13, 2000

Related U.S. Application Data

(63) Continuation of application No. PCT/JP99/05837, filed on Oct. 22, 1999.

(30) Foreign Application Priority Data

Nov. 13, 1998 (JP) ............................................ 10-341129

(51) Int. Cl.[7] ............................................. G11B 21/10
(52) U.S. Cl. ............................... 360/234.5; 360/245.8; 360/294.1
(58) Field of Search ....................... 360/234.5, 234.6, 360/246.7, 264.5, 245.8, 245.3, 294.1; 369/300

(56) References Cited

U.S. PATENT DOCUMENTS

| | | | | |
|---|---|---|---|---|
| 4,317,149 A | * | 2/1982 | Elser et al. ................. | 360/110 |
| 4,761,699 A | * | 8/1988 | Ainslie et al. ............. | 29/603.01 |
| 5,021,907 A | * | 6/1991 | Zak .......................... | 360/234.6 |
| 5,079,659 A | * | 1/1992 | Hagen ....................... | 360/234.6 |
| 5,142,425 A | * | 8/1992 | Gailbreath et al. ......... | 360/123 |
| 5,657,186 A | | 8/1997 | Kudo et al. ................ | 360/234.5 |
| 5,870,258 A | * | 2/1999 | Khan et al. ................ | 360/245.9 |
| 5,896,248 A | * | 4/1999 | Hanrahan et al. .......... | 29/603.03 |
| 5,901,014 A | * | 5/1999 | Hiraoka et al. ............ | 360/234.5 |
| 5,943,190 A | * | 8/1999 | Fanslau, Jr. ............... | 360/245.3 |
| 5,959,808 A | * | 9/1999 | Fan et al. .................. | 360/294.3 |
| 6,046,884 A | * | 4/2000 | Crane ........................ | 360/244.2 |
| 6,078,473 A | * | 6/2000 | Crane et al. .............. | 360/294.3 |
| 6,160,688 A | * | 12/2000 | Okumura .................... | 360/323 |
| 6,262,868 B1 | * | 7/2001 | Arya et al. ................. | 360/290 |
| 6,295,185 B1 | * | 9/2001 | Stefansky ................. | 360/294.5 |
| 6,349,017 B1 | * | 2/2002 | Schott ....................... | 360/234.5 |
| 6,351,353 B1 | * | 2/2002 | Sluzewski et al. ......... | 360/244.2 |

FOREIGN PATENT DOCUMENTS

| | | |
|---|---|---|
| JP | 2-61810 | 3/1990 |
| JP | 2-244419 | 9/1990 |
| JP | 3-95717 | 4/1991 |
| JP | 06-259905 | 9/1994 |
| JP | 06-309822 | 11/1994 |
| JP | 8-111015 | 4/1996 |
| JP | 08-180623 | 7/1996 |
| WO | WO98/19304 | 5/1998 |

* cited by examiner

*Primary Examiner*—Brian E. Miller
(74) *Attorney, Agent, or Firm*—Oblon, Spivak, McClelland, Maier & Neustadt, P.C.

(57) ABSTRACT

A write/read head supporting mechanism including a slider having an electromagnetic transducer element or an optical module, a suspension for supporting the slider and including a ground region, and a microactuator disposed between the slider and the suspension for displacing said slider. Further, at least a part of the microactuator includes an electrically conductive region, and the ground region of the suspension is electrically connected to the slider by the electrically conductive region of the microactuator, such that the slider is grounded so as to prevent an electrostatic breakdown of the electromagnetic transducer element or the optical module.

2 Claims, 5 Drawing Sheets

WRITE/READ HEAD SUPPORTING MECHANISM INCLUDING A MICROACTUATOR AND A SLIDER CONNECTED TO A GROUND REGION OF A SUSPENSION

This is a continuation of PCT/JP99/05,837 filed Oct. 22, 1999.

ART FIELD

The present invention relates to a write/read head supporting mechanism for write/read systems such as hard disk drives (hereinafter HDDs for short) or optical disk drives, and a write/read system comprising such a write/read head supporting mechanism.

BACKGROUND ART

A prior art magnetic head supporting mechanism used with HDDs is generally built up of a slider having an electromagnetic transducer element, a suspension for supporting the slider, and an interconnecting pattern connected to the electromagnetic transducer element.

The electromagnetic transducer element comprises a magnetic pole and coil for converting electric signals to magnetic signals, and vice versa, a magnetoresistance effect element for transforming magnetic signals to voltage signals, and so on, each being fabricated by thin-film techniques, assembly techniques, etc. The slider is formed of non-magnetic ceramics such as $Al_2O_3$—TiC or $CaTiO_3$ or a magnetic material such as ferrite, and has a generally cuboidal shape. The surface (air bearing surface) of the slider opposite to a disk medium is configured into a shape suitable for generating pressure to fly the slider over the disk medium at a small spacing. The suspension for supporting the slider is formed by bending, punching or otherwise processing a resilient stainless sheet.

When the slider is used in actual applications, static electricity is generated at the slider. This static electricity is generated due to a sliding movement between the flying surface of the slider and the surface of a disk medium at contact start stop (CSS), contact of the flying surface of the slider with the surface of the disk medium which is caused by a very small amount of flying of the slider with respect to the surface of the disk medium rotating at high speed, friction between the slider and the air, etc.

Static electricity, when generated at the slider, often gives rise to an electrostatic breakdown of the electromagnetic transducer element. To avoid this, most magnetic heads have sliders connected to a ground (e.g., JP-A's 2-61810, 2-244419 and 8-111015). The aforesaid JP-A 2-61810 discloses a thin-film magnetic head wherein a conductor electrically connected to a magnetic core mounted on a slider is bonded to a gimbal part of a suspension at an earth potential by means of an electrically conductive adhesive agent. The aforesaid JP-A 2-244419 discloses that the side of a slider and a suspension are bonded together by means of an electrically conductive adhesive agent. The aforesaid JP-A 8-111015 discloses a magnetic head system wherein a ground electrode is mounted on a flexible wiring substrate provided on a suspension, and then electrically connected to a slider.

On the other hand, an HDD is increasingly required to be downsized with ever-higher recording density and, hence, have ever-higher track density and ever-narrower track width. To improve tracking precision in a high-density recording HDD, it is effective to provide the magnetic head with an actuator for effecting a micro-displacement of the electromagnetic transducer element or slider with respect to the suspension. Such an actuator, for instance, is disclosed in JP-A's 6-259905, 6-309822 and 8-180623.

SUMMARY OF THE INVENTION

In a magnetic head having an actuator, a slider is displaced relatively to a suspension when the slider is driven by the actuator. There is thus a possibility that an electrical wire connecting the suspension side to the slider side may be detrimental to this displacement.

However, the aforesaid publications, each disclosing the provision of an actuator, say nothing about the connection of the slider to a ground. Accordingly or as a matter of course, the publications disclose nothing about the means for connecting the slider to a ground without detriment to the displacement capability of the actuator when it is provided.

An object of the invention is to provide a write/read head supporting mechanism for a magnetic disk system or optical disk system having an actuator for effecting a micro-displacement of an electromagnetic transducer element or slider, wherein any electrostatic breakdown of the electromagnetic transducer element or optical module is prevented without detriment to the displacement capability of the actuator.

Such an object is achievable by the following constructions.

(1) A write/read head supporting mechanism comprising a slider provided with an electromagnetic transducer element or an optical module, and a suspension, wherein said slider is supported on said suspension by way of an actuator for displacing said slider, and a ground region that said suspension has is electrically connected to said slider by means of an electrical connecting member that is movable and/or deformable in a displacement direction of said slider by said actuator.

(2) The write/read head supporting mechanism according to (1) above, wherein said suspension is made up of an electrically conductive material, and said suspension itself is utilized as said ground region.

(3) The write/read head supporting mechanism according to (1) above, wherein said suspension is provided on a surface thereof with a grounding electrode as said ground region.

(4) A write/read head supporting mechanism comprising a slider provided with an electromagnetic transducer element or an optical module, and a suspension, wherein said slider is supported on said suspension by way of an actuator for displacing said slider, and at least a part of said actuator is provided with an electrically conductive region, by way of which a ground region that said suspension has is electrically connected to aid slider.

(5) The write/read head supporting mechanism according to (4) above, wherein a ground electrode used to drive said actuator is utilized as said electrically conductive region.

(6) A write/read head supporting mechanism comprising a slider provided with an electromagnetic transducer element or an optical module, and a suspension, wherein said slider is supported on said suspension by way of an actuator for displacing said slider, and which comprises an interconnecting pattern including a wire for electrical connection to said electromagnetic transducer element or said optical module and a grounding wire for electrical connection to said slider, said interconnecting pattern comprising a close-contact wire in close contact with said suspension and a floating wire that extends away from said suspension to said slider and is movable and/or deformable in a displacement direction of said slider by said actuator.

(7) A write/read head supporting mechanism comprising a slider provided with an electromagnetic transducer element or an optical module, and a suspension, wherein said slider is supported on said suspension by way of an actuator for displacing said slider, a leading end portion of said suspension comprises a flexible region that is curved or bent toward a slider side and movable and/or deformable in a displacement direction of said slider by said actuator, and an interconnecting pattern is in close contact with a surface of said flexible region, said interconnecting pattern comprising a wire for electrical connection to said electromagnetic transducer element or said optical module and a grounding wire for electrical connection to said slider.

(8) The write/read head supporting mechanism according to (6) or (7) above, wherein said suspension is made up of an electrically conductive material, and said grounding wire led out of said interconnecting pattern is electrically connected to said suspension.

(9) A write/read system comprising a write/read head supporting mechanism as recited in any one of (1) to (8) above.

BEST MODE OF CARRYING OUT THE INVENTION

The write/read head supporting mechanism according to the invention comprises a slider provided with an electromagnetic transducer element or an optical module, and a suspension on which the slider is mounted while an actuator for displacing the slider is located between them. The present invention will now be explained with reference to a magnetic head with an electromagnetic transducer element mounted on a slider.

First of all, typical constructions of the suspension, actuator and slider are explained.

Figure 11:
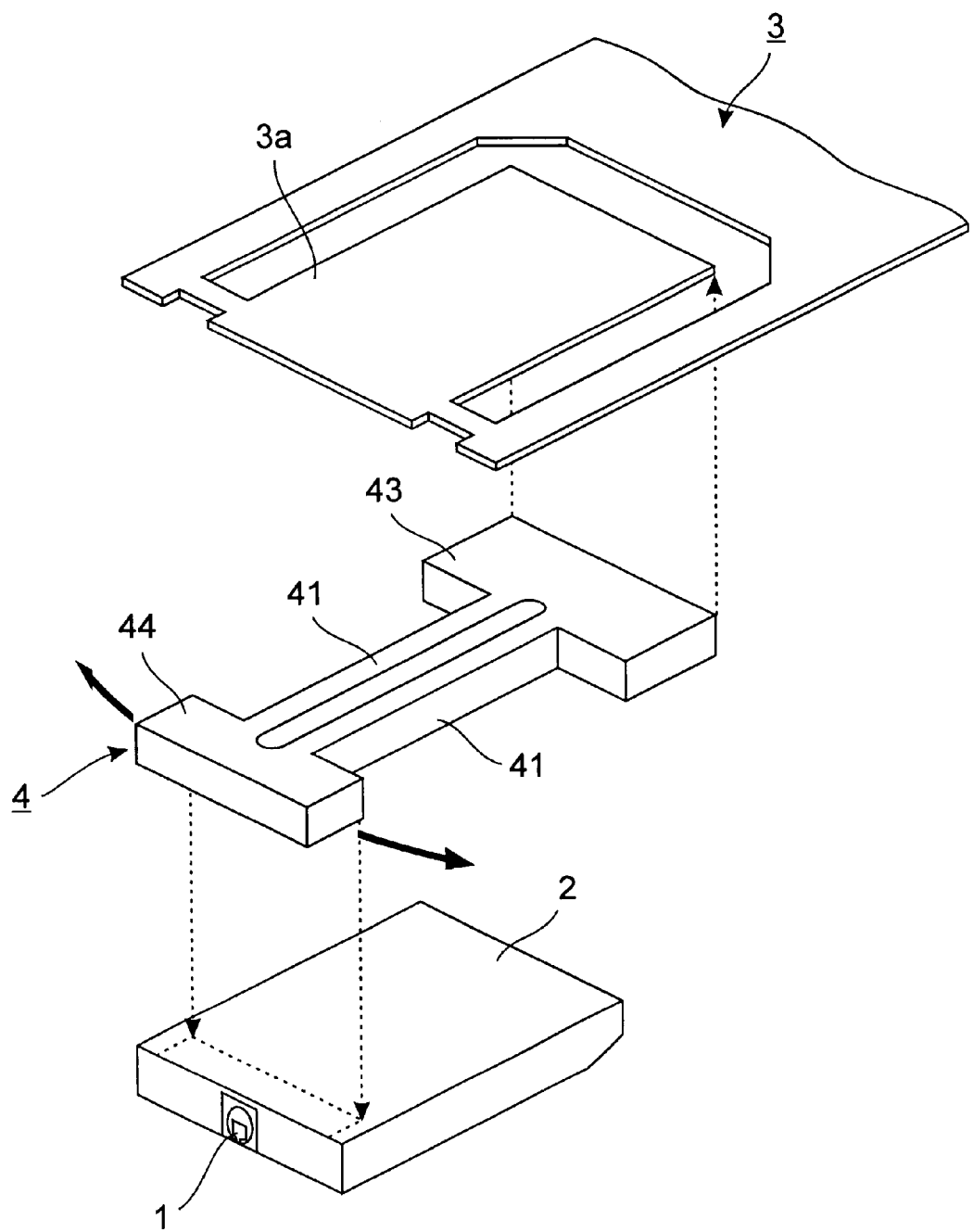
FIG. 11 is an exploded perspective view illustrative of one exemplary arrangement of the magnetic head supporting mechanism.

FIG. 11 is an exploded perspective view of one exemplary arrangement of the magnetic head supporting mechanism including an actuator. This magnetic head supporting mechanism is built up of a slider 2 provided with an electromagnetic transducer element 1 and a suspension 3 for supporting the slider 2, with an actuator 4 located between the slider 2 and the suspension 3.

The actuator 4 is provided to effect a micro-displacement of the slider 2 with respect to the suspension 3, and is fixed as by bonding to a gimbal block 3a located at an end portion of the suspension 3. The gimbal block 3a is formed by providing grooves in the suspension member by etching, punching or the like for the purpose of allowing the slider to follow a disk medium surface. It is here noted that the magnetic head is provided with a main actuator (a VCM or the like) for driving the whole of the suspension.

The actuator 4 comprises a fixed part 43 and a movable part 44, and further includes two rod-like displacement generating means 41 and 41. Each or the displacement generating means 41 is provided with at least one piezoelectric or electrostrictive material layer having electrode layers on both sides, and constructed such that it elongates and contracts upon the application of voltage on the electrode layers. The piezoelectric or electrostrictive material layer is formed of a piezoelectric or electrostrictive material that elongates and contracts by inverse piezoelectric effect or electrostrictive effect. One end of the displacement generating means 41 is coupled to the suspension via the fixed part 43, and the other end of the displacement generating means 41 is coupled to the slider via the movable part 44. Upon the elongation and contraction of the displacement generating means 41, the slider is so displaced that the electromagnetic transducer element is displaced circularly. This in turn causes the electromagnetic transducer element to cross over recording tracks on a disk medium.

When the piezoelectric or electrostrictive material layer sandwiched between the electrode layers in the displacement generating means 41 of the actuator 4 is constructed of a so-called piezoelectric material such as PZT, the piezoelectric or electrostrictive material layer is usually subjected to a polarizing treatment so as to improve its displacement capability. The direction of polarization by this polarization treatment is a thickness-wise direction of the actuator. When the direction of an electric field upon the application of voltage on the electrode layers is in alignment with the direction of polarization, the piezoelectric or electrostrictive material layer between both electrode layers elongates in its thickness-wise direction (piezoelectric longitudinal effect), and contracts in its plane direction (piezoelectric transverse effect). When the direction of the electric field is reverse to the direction of polarization, on the other hand, the piezoelectric or electrostrictive material layer contracts in its thickness-wise direction (piezoelectric longitudinal effect), and elongates in its plane direction (piezoelectric transverse effect). When contraction-inducing voltage is applied alternately on one displacement generating means and another displacement generating means, the length ratio between one displacement generating means and another displacement generating means changes so that both displacement generating means deflect in the same direction in the plane of the actuator. By this deflection, the movable part 44 rolls and pitches with respect to the fixed part 43 in a direction indicated by arrows in FIG. 11, with the center of the roll-and-pitch motion defined by the position of the movable part 44 in the absence of voltage. This roll-and-pitch motion allows the movable part 44 to displace circularly in a direction substantially perpendicular to the direction of elongation and contraction of the displacement generating means 41, with the direction of the roll-and-pitch motion lying within the plane of the actuator. Thus, the electromagnetic transducer element, too, rolls and pitches in a circular orbit. At this time, there is no fear of attenuation of polarization because the direction of voltage is in alignment with that of polarization. It is noted that even when both the displacement generating means are elongated by voltage applied alternately thereon, similar roll-and-pitch motion occurs.

In the illustrated embodiment, voltages may be simultaneously applied on both displacement generating means in such a manner that their displacements are reverse to each other. In other words, alternating voltages may be simultaneously applied on both the displacement generating means in such a manner that one elongates while another contracts, and vice versa. At this time, the center of the roll-and-pitch motion of the movable part 44 is defined by the position of the movable part 44 in the absence of voltage. Assuming here that the same driving voltage is used, the amplitude of the roll-and-pitch motion is about twice as large as that in the case of the alternate application of voltage. On one side of the roll-and-pitch motion in this case, however, the displacement generating means is so elongated that the direction of the driving voltage is reverse to the direction of polarization. For this reason, the polarization of the piezoelectric or electrostrictive material layer may possibly attenuate at a high applied voltage or upon the continued application of voltage. It is thus required that the driving voltage be obtained by applying a constant direct current bias voltage in the same direction as that of polarization and superposing the aforesaid alternating voltage on the bias voltage, thereby foreclosing the possibility that the direction of driving voltage may be reverse to the direction of polarization. The center of the roll-and-pitch motion in this case is defined by the position of the displacement generating means with the bias voltage alone applied thereon.

The illustrated actuator has a structure in which the displacement generating means 41, and fixed and movable parts 43 and 44 are formed as an integrated single piece by holing and notching a sheet-like member of piezoelectric or electrostrictive material with electrode layers formed at given sites. It is thus possible to increase the rigidity and dimensional accuracy of the actuator, with no fear of assembly errors. In addition, since any adhesive is not used for actuator fabrication, it is highly unlikely that any adhesive layer is deposited at the position of the actuator where stresses are induced by the deformation of the displacement generating means. Stated otherwise, problems such as transmission losses due to the adhesive layer and changes-with-time of adhesion strength are absolutely unlikely to come up.

By the "piezoelectric or electrostrictive material" used herein is meant a material capable of elongating or contracting due to the inverse piezoelectric effect or electrostrictive effect. Any desired piezoelectric or electrostrictive material may be used provided that it can be applied to the displacement generating means of the actuator. By reason of high rigidity, however, it is usually preferable to use ceramic piezoelectric or electrostrictive materials such as PZT [Pb(Zr, Ti)$O_3$], PT (PbTi$O_3$), PLZT [(Pb, La)(Zr, Ti)$O_3$], and barium titanate (BaTi$O_3$). The actuator, when it is made up of ceramic piezoelectric or electrostrictive materials, may easily be fabricated using thick-film techniques such as a sheet-making or printing process. It is noted that the actuator may also be fabricated by thin-film techniques. The piezoelectric or electrostrictive material, when it has a crystallographic structure, may be of either a polycrystalline structure or a monocrystalline structure.

No special limitation is imposed on how to form the electrode layers; an appropriate selection may be made from various processes such as printing, firing, sputtering, and evaporation of conductive paste while how to form the piezoelectric or electrostrictive material layer is taken into account.

An actuator may have any structure in which at least one piezoelectric or electrostrictive material layer, having electrode layers on both sides, exists at the displacement generating means. However, it is preferable to use a multi-layer structure wherein two or more such piezoelectric or electrostrictive material layers are stacked one upon another. The amount of elongation and contraction of the piezoelectric or electrostrictive material layer is proportional to electric field intensity. However, the aforesaid multilayer structure makes it possible to make the piezoelectric or electrostrictive material layer so thin that the required electric field intensity can be obtained at a low voltage, and so the driving voltage can be lowered. At the same driving voltage as that used with a single layer structure, the amount of elongation and contraction can become much larger. The thickness of the piezoelectric or electrostrictive material layer is not critical, and so may be determined depending on various conditions such as driving voltage, the required amount of elongation and contraction, and ease of fabrication. However, a thickness of about 5 $\mu$m to about 50 $\mu$m is usually preferred in the practice of the invention. Similarly, the upper limit to the number of piezoelectric or electrostrictive material layers stacked one upon another is not critical, and so may be determined in such a manner that displacement generating means having a desired thickness are obtainable. It is noted that a covering piezoelectric or electrostrictive material layer is usually provided on the outermost electrode layer.

The slider 2 is constructed of ceramics having a relatively low electric resistance, e.g., $Al_2O_3$—TiC or Mn—Zn ferrite. The slider 2 is provided on one side with a magnetic core or coil by way of an insulating layer to form the electromagnetic transducer element 1.

Although not illustrated, the suspension 3 is provided on its surface with an interconnecting pattern for driving the actuator 4 and an interconnecting pattern to be connected to the electromagnetic transducer element 1 as occasion may be. The suspension 3 may also be provided on its surface with a head driving IC chip (a read/write IC). If a signal processing IC is mounted on the suspension, it is then possible to reduce the length of the interconnecting pattern from the electromagnetic transducer element to the signal processing IC, so that the signal frequency can be made high due to a decrease in inducing components.

While the present invention is suitable for cases where the actuator of the integral structure shown in FIG. 11 is used, it is understood that the present invention may also be used for cases where various actuators having assembly structures employing piezoelectric elements, and actuators making use of electrostatic force, and electromagnetic force are used.

The suspension 3 is generally formed of a resilient metal material such as stainless steel; however, it is acceptable to construct the suspension 3 of an insulating material such as resins. For the interconnecting pattern, on the other hand, a part thereof has a general structure wherein a resin-coated conductor wire is brought in close contact with the surface of the suspension. No special limitation is imposed on how to form the interconnecting pattern having such a structure; however, it is preferable to make use of a process wherein an insulating resin film is formed on the surface of the suspension 3 and a conductor wire is formed on the resin film followed by forming another resin film thereon as a protective film, and a process wherein an interconnecting film (a flexible wiring substrate) having a multilayer structure comprising such a resin film and a conductor wire is bonded to the suspension 3.

In the magnetic head supporting mechanism constructed as explained above according to the present invention, the slider is grounded so as to prevent an electrostatic breakdown of the electromagnetic transducer element. How the slider is grounded according to the present invention is now explained specifically.

According to the first aspect of the invention, a ground region of the suspension is electrically connected to the slider by way of an electrical connecting member movable and/or deformable in the displacement direction of the slider by the actuator.

Figure 1:
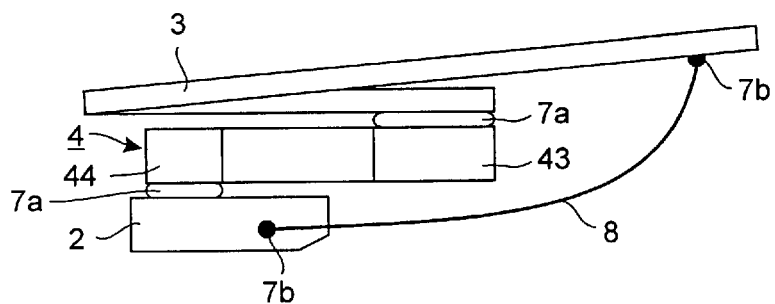
FIG. 1 is a side view illustrative of one exemplary arrangement of the magnetic head according to the first aspect of the invention, wherein the slider is mounted on the suspension by way of the actuator.

One exemplary arrangement of the first aspect of the invention is shown in FIG. 1. FIG. 1 is a side view illustrative of a slider 2 attached to a suspension 3 by way of an actuator 4. Adhesive agents 7a are used to bond a fixed part 43 of the actuator 4 to the suspension 3 and a movable part 44 of the actuator 4 to the slider 2. The suspension 3 is made up of an electrically conductive material such as a metal, and kept at a ground potential. Thus, the suspension 3 itself provides the aforesaid ground region. The slider 2 and suspension 3 are electrically connected together by means of a highly flexible lead 8, so that static electricity generated at the slider 2 can flow to the suspension 3 through the lead 8. It is here noted that the lead 8 is bonded to the slider 2 and suspension 3, using electrically conductive adhesive agents 7b and 7b, respectively.

Figure 2:
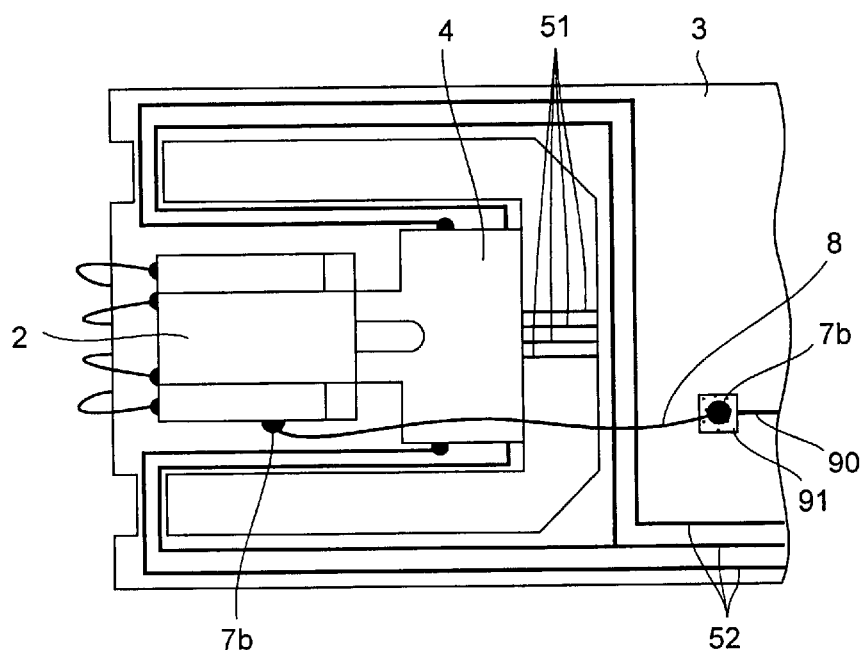
FIG. 2 is a plan view illustrative of another exemplary arrangement of the magnetic head according to the first aspect, wherein the slider is mounted on the surface of the suspension opposite to the medium by way of the actuator.

Another exemplary arrangement of the first aspect of the invention is shown in FIG. 2. FIG. 2 is a plan view of a slider 2 attached to a suspension 3 by way of an actuator 4, as viewed from the side of the suspension 3 opposite to a medium. As depicted in FIG. 2, the suspension 3 is provided on its surface with a grounding wire 90, one end of which is connected with a grounding electrode 91 defining the aforesaid ground region. The other end of the grounding wire 90 is connected to an electrical conductor at a ground potential (an HDD package or the like). The grounding electrode 91 and slider 2 are electrically connected together by means of a highly flexible lead 8; that is, the slider 2 is grounded. It is here noted that the lead 8 is bonded to the slider 2 and grounding electrode 91, using electrically conductive adhesive agents 7b and 7b, respectively. In FIG. 2, reference numeral 52 stands for an actuator driving wire assembly comprising two signal wires and one grounding wire and located in close contact with the surface of the suspension 3. Reference numeral 51 represents signal wires for electrical connection to an electromagnetic transducer element. The signal wires extend from the back side of the suspension 3, and are turned back around the leading end of the suspension 3, terminating at connections to a terminal electrode group in the electromagnetic transducer element provided on the slider 2.

According to the arrangements of FIGS. 1 and 2 where the lead 8 used is of high flexibility, the actuator 4 can be undisturbedly displaced upon the slider 2 grounded. In addition, the site of the lead 8 to be bonded to the slider 2 can be relatively freely selected. According to the arrangement shown in FIG. 2, the slider 2 can be grounded even when the suspension 3 is made up of an insulating material.

Figure 3:
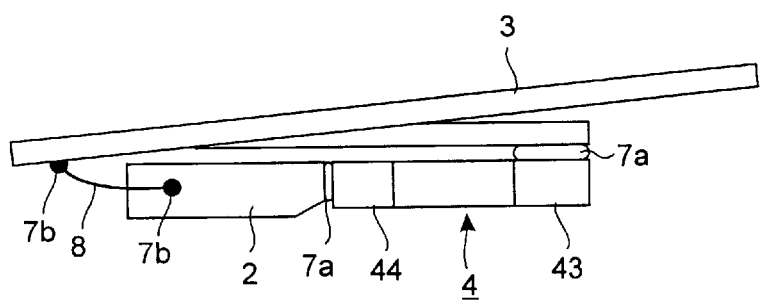
FIG. 3 is a side view illustrative of yet another exemplary arrangement of the magnetic head according to the first aspect, wherein the slider is mounted on the suspension by way of the actuator.

FIG. 3 is illustrative of yet another arrangement of the first aspect of the invention. In FIG. 1, the actuator 4 is located on the back surface of the slider 2, i.e., the surface of the slider 2 opposite to the suspension 3. In FIG. 3, however, the actuator 4 is located on the side of the slider 2 so as to keep low the whole height of the arrangement. Otherwise, the arrangement of FIG. 3 is the same as that of FIG. 1. In all aspects encompassed in the present invention inclusive of the first aspect, the slider is positioned with respect to the actuator as shown in either one of FIGS. 1 and 3.

According to the second aspect of the invention, at least a part of the actuator is provided with an electrically conductive region, by way of which the ground region of the suspension is electrically connected to the slider.

Figure 4:
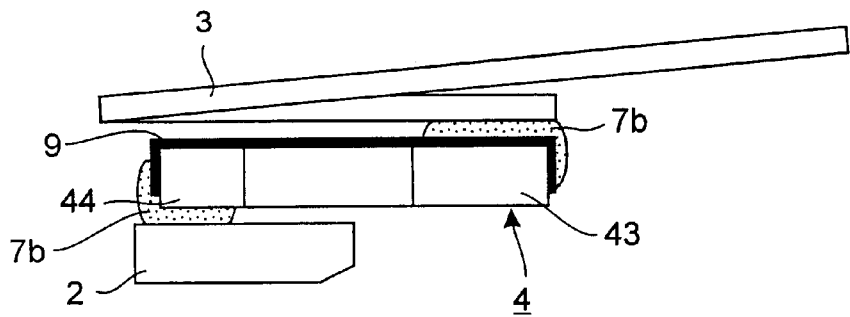
FIG. 4 is a side view illustrative of one exemplary arrangement of the magnetic head according to the second aspect of the invention, wherein the slider is mounted on the suspension by way of the actuator.

One exemplary arrangement of the second aspect of the invention is shown in FIG. 4. FIG. 4 is a side view illustrative of a slider 2 attached to a suspension 3 by way of an actuator 4. The suspension 3 is made up of an electrically conductive material such as a metal, and kept at a ground potential. The actuator is provided on its surface with a grounding conductor 9 in the form of the aforesaid conductive region in such a way that a fixed part 43 is connected to a movable part 44. Using electrically conductive adhesive agents 7b and 7b, respectively, the fixed part 43 of the actuator 4 is bonded to the suspension 3 and the movable part 44 of the actuator 4 is bonded to the slider 2. These adhesive agents 7b and 7b cover one end and the other end of the aforesaid grounding conductor 9. Thus, the slider 2 is grounded.

Although depending on the type of the actuator used, it is noted that the whole or a surface portion of the actuator may be made up of an electrically conductive material. In this case, the whole or surface portion of the actuator may be utilized as the aforesaid conductive region to connect the slider to a ground.

Figure 5:
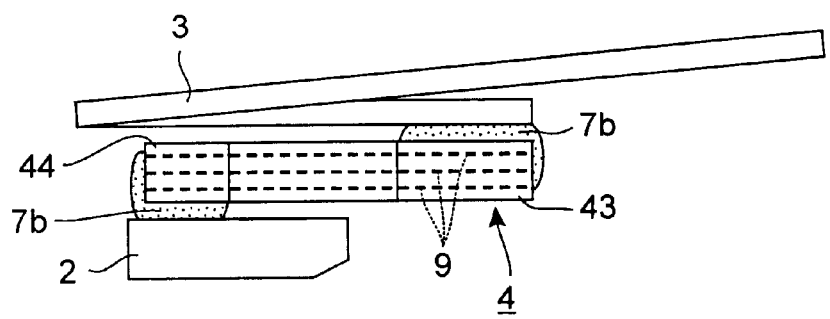
FIG. 5 is a side view illustrative of another exemplary arrangement of the magnetic head according to the second aspect, wherein the slider is mounted on the suspension by way of the actuator.

Another exemplary arrangement of the second aspect of the invention is shown in FIG. 5. An actuator 4 shown in FIG. 5 is such a multilayer piezoelectric actuator as mentioned above. As already explained, the multilayer piezoelectric actuator has a structure wherein a piezoelectric or electrostrictive material layer is sandwiched between a pair of electrode layers. In the arrangement of FIG. 5, a ground electrode (a grounding conductor 9 shown in FIG. 5) that is one of the pair of electrode layers is utilized as the aforesaid conductive region to connect a slider 2 to a ground. More illustratively, both ends of the grounding conductor 9 are bared on the side of the actuator 4. Then, electrically conductive adhesive agents 7b and 7b are respectively used to connect one end of the conductor 9 electrically to the suspension 3 and the other end electrically to the slider 2, thereby connecting the slider 2 to a ground. Otherwise, the arrangement of FIG. 5 is the same as that of FIG. 4.

According to the arrangements shown in FIGS. 4 and 5, the electrically conductive adhesive agents are used instead of a conventional adhesive agent when the actuator 4 is bonded to the suspension 3 and slider 2, respectively. When the actuator 4 is fabricated, only the formation or baring of the grounding conductor 9 is needed to connect the slider 2 to a ground. There is thus no detriment to the displacement capability of the actuator 4 at all upon the slider 2 connected to a ground. In addition, the number of steps needed for connecting the slider 2 to a ground can be reduced.

In the arrangements of FIGS. 4 and 5, only the electrically conductive adhesive agent is utilized. In some cases, however, the electrically conductive adhesive agent is inferior in adhesion to an ordinary adhesive agent. This is because the conductive adhesive agent generally comprises an adhesive resin in which an electrically conductive material such as silver foils or carbon powders is dispersed. If required, it is thus acceptable to use the conductive adhesive agent in combination with such an ordinary adhesive agent.

Figure 6:
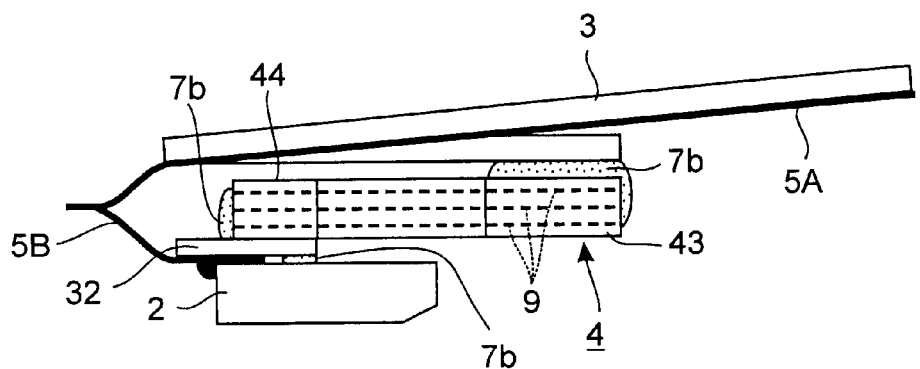
FIG. 6 is a side view illustrative of yet another exemplary arrangement of the magnetic head according to the second aspect, wherein the slider is mounted on the suspension by way of the actuator.

Yet another exemplary arrangement of the second aspect of the invention is shown in FIG. 6. As shown, there is provided an interconnecting pattern comprising a flexible wiring substrate including a signal wire for electrical connection to an electromagnetic transducer element on a slider 2. This interconnecting pattern is constructed of a close-contact wire 5A in close contact with the surface of a suspension 3 and a floating wire 5B extending away from the suspension 3 to the slider 2. It is here noted that an actuator driving wire is not shown.

The interconnecting pattern comprising close-contact wire 5A and floating wire 5B is provided by forming the close-contact wire comprising a flexible wiring substrate on the surface of the suspension 3 opposite to a medium and then removing a leading end portion of the suspension 3, thereby placing a part of the close-contact wire in a floating state. In the illustrated arrangement, a terminal electrode group for electrical connection to the electromagnetic transducer element is previously formed on the leading end portion of the suspension 3. Then, a part of the leading end portion of the suspension 3 is removed in such a way that the vicinity of the terminal electrode group is left as a terminal electrode sheet 32. Subsequently, the floating wire 5B is curved or bent toward the side of the slider 2 so that one surface of the terminal electrode sheet 32 is bonded to the slider 2 and the other surface is bonded to the actuator 4 while the aforesaid terminal electrode sheet is connected to a terminal electrode group on the slider 2. Removal of a part of the suspension 3, for instance, may be achieved by punching or wet etching.

The arrangement of FIG. 6 is similar to that of FIG. 5 in that the grounding conductor 9 of the actuator 4 is utilized as the aforesaid conductive region to connect the slider 2 to a ground. On the side of the movable part 44 of the actuator 4 in the arrangement of FIG. 6, however, the grounding conductor 9 is connected to one surface of the terminal electrode sheet 32 by means of an electrically conductive adhesive agent 7b, and the slider 2 is connected to the other surface of the terminal electrode sheet 32 by means of an electrically conductive adhesive agent 7b. The terminal electrode sheet 32 is formed of the same conductive material as that of the suspension 3, so that the slider 2 can be electrically connected to the suspension 3.

In the arrangements of FIGS. 5 and 6, the conductive suspension 3 and grounding conductor 9 are connected together by means of the conductive adhesive agents 7b and 7b, so that the slider 2 can be connected to a ground by way of them. Alternatively, the grounding conductor 9 may be connected with a grounding wire which is in turn extended to the side of the suspension 3. For instance, actuator driving wires 52 including a grounding wire may be used as shown in FIG. 2. In this case, the grounding wire may be connected to either the conductive suspension 3 or an electrical conductor at a ground potential (an HDD package, etc.). In the former case, a grounding wire drawn out of somewhere in the interconnecting pattern may be connected to the suspension 3, as is the case with a grounding wire 90 of FIG. 10. In the latter case, the suspension 3 is not necessarily an electrical conductor. If the grounding wire is utilized, it is thus possible to minimize modifications to the fabrication step for connecting the slider 2 to a ground. In addition, since the bonding of the actuator 4 to the suspension 3 can be carried out using an ordinary adhesive agent, it is possible to make adhesion strength higher than achieved with an electrically conductive adhesive agent.

The magnetic head according to the third aspect of the invention comprises an interconnecting pattern including a wire for electrical connection to an electromagnetic transducer element and a grounding wire for electrical connection to a slider. This interconnecting pattern comprises a close-contact wire in close contact with the suspension and a floating wire extending away from the suspension to the slider. The close-contact wire is movable and/or deformable in the displacement direction of the slider by the actuator.

Figure 7:
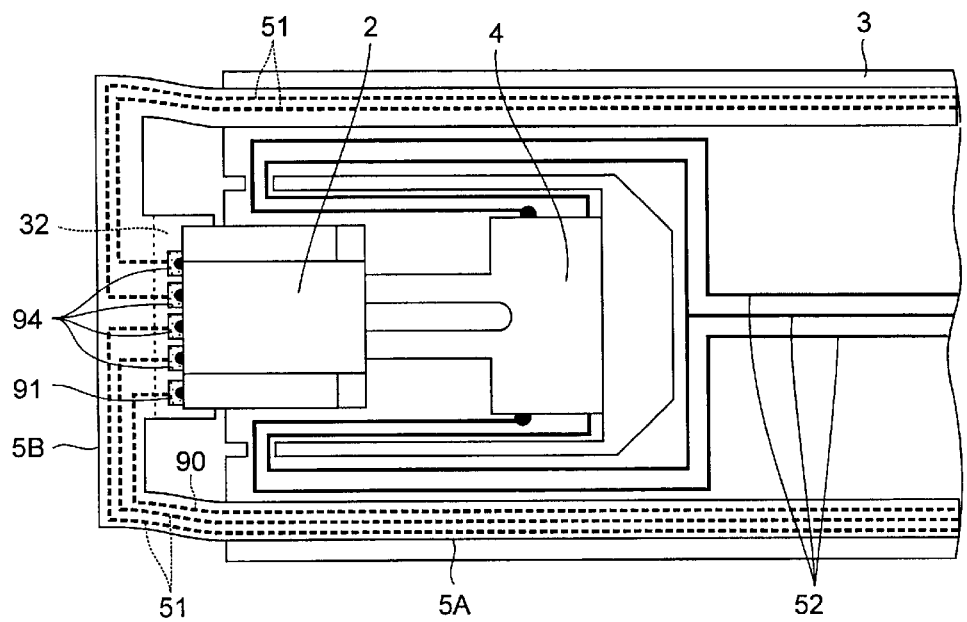
FIG. 7 is a plan view illustrative of one exemplary arrangement of the magnetic head according to the third aspect of the invention, wherein the slider is mounted on the surface of the suspension opposite to the medium by way of the actuator.

One exemplary arrangement of the third aspect of the invention is shown in FIG. 7. FIG. 7 is a plan view of a slider 2 attached to a suspension 3 by way of an actuator 4, as viewed from the side of the suspension 3 opposite to a medium.

As shown in FIG. 7, there is provided an interconnecting pattern comprising a flexible wiring substrate 51 including a signal wire for electrical connection to an electromagnetic transducer element on a slider 2. This interconnecting pattern is constructed of a close-contact wire 5A in close contact with the surface of a suspension 3 and a floating wire 5B extending away from the suspension 3 to at the slider 2. In FIG. 7, reference numeral 52 indicates an actuator driving wire located in close contact with the surface of the suspension 3.

The interconnecting pattern comprising close-contact wire 5A and floating wire 5B is provided by forming the close-contact wire comprising a flexible wiring substrate on the surface of the suspension 3 opposite to a medium and then removing a leading end portion of the suspension 3, thereby placing a part of the close-contact wire in a floating state. In the illustrated arrangement, a terminal electrode group 94 comprising four terminal electrodes is previously formed on the leading end portion of the flexible wiring substrate. Then, a part of the leading end portion of the suspension 3 is removed in such a way that the vicinity of the terminal electrode group 94 is left as a terminal electrode sheet 32. Subsequently, the floating wire 5B is curved or bent toward the side of the slider 2 so that the terminal electrode sheet 32 is bonded to the back surface of the slider 2 and the terminal electrode group 94 is connected to a terminal electrode group on the slider 2. It is noted, however, that it is not an essential requirement to form the terminal electrode sheet 32; that is, it is acceptable to connect the floating wire 5B directly to the terminal electrode group on the slider 2. Removal of a part of the suspension 3, for instance, may be achieved by punching or wet etching.

In FIG. 7, the floating wire 5B is formed in such a way that it is connectable to the terminal electrode group on the slider 2, and movable and/or deformable in the displacement direction of the slider 2 by the actuator 4 while placed in the thus connected state. Accordingly, the floating wire 5B is unlikely to provide any impediment to the displacement capability of the actuator 4.

The interconnecting pattern comprising close-contact wire 5A and floating wire 5B includes a grounding wire 90 in addition to the signal wire 51 for electrical connection to the electromagnetic transducer element. The grounding wire 90 is connected at one end to a grounding electrode 91 in juxtaposition with the terminal electrode group 94 formed on the floating wire 5B and at the other end to an electrical conductor at a ground potential (an HDD package, etc.). The grounding electrode 91 is electrically connected to the slider 2 by means of an electrically conductive adhesive agent, a gold ball or the like; that is, the slider 2 can be connected to a ground.

Figure 8:
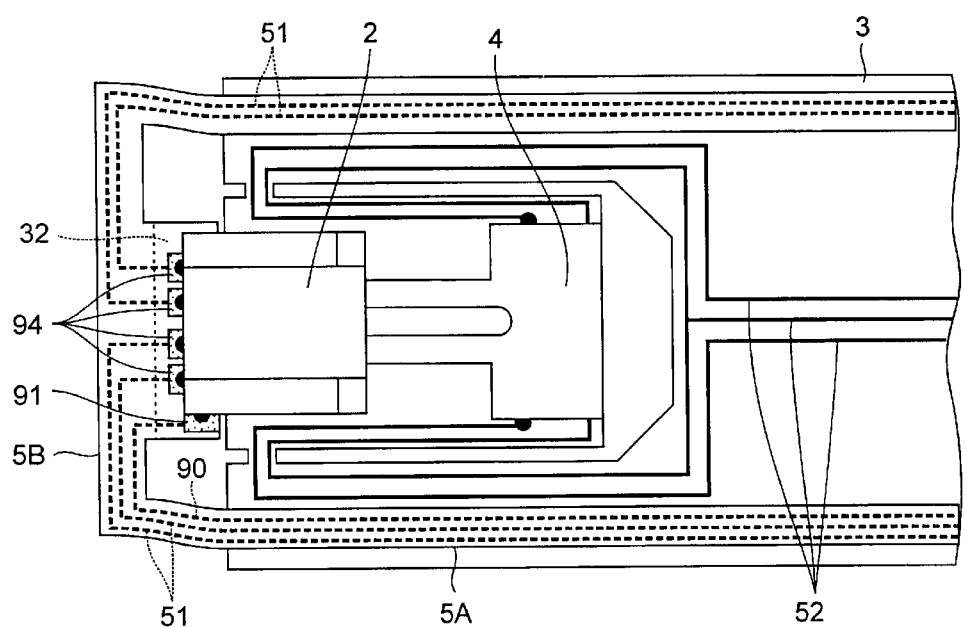
FIG. 8 is a plane view illustrative of another exemplary arrangement of the magnetic head according to the third aspect, wherein the slider is mounted on the surface of the suspension opposite to the medium by way of the actuator.
Figure 9:
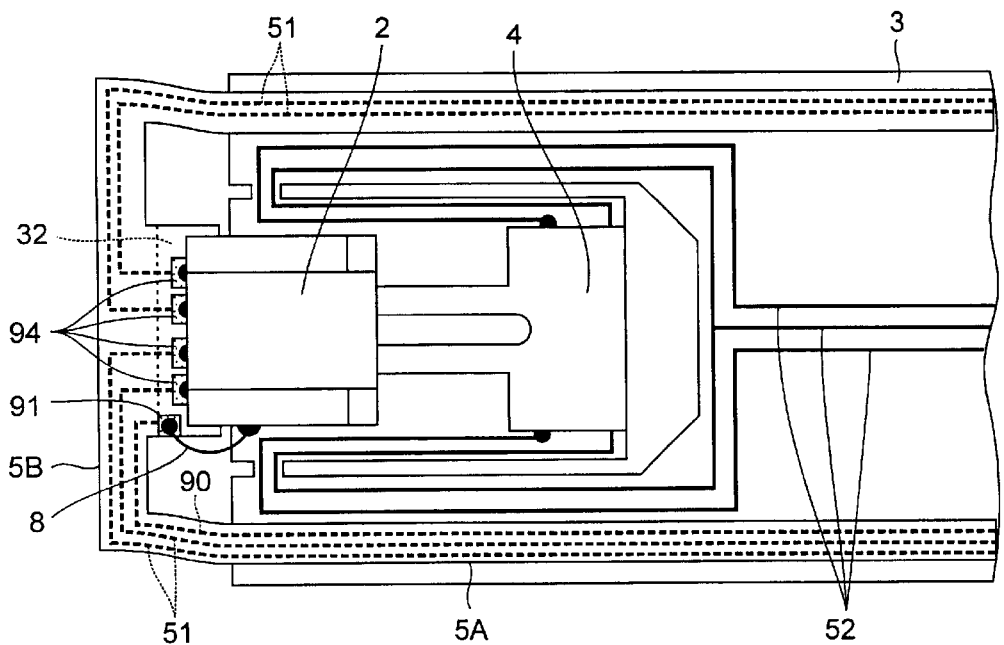
FIG. 9 is a plan view illustrative of yet another exemplary arrangement of the magnetic head according to the third aspect, wherein the slider is mounted on the surface of the suspension opposite to the medium by way of the actuator.

In the arrangement of FIG. 7, the grounding electrode 91 on the floating wire 5B is electrically connected to the surface of the slider 2 on which the electromagnetic transducer element is formed. When a low-resistance ceramic material such as $Al_2O_3$—TiC is not exposed on that surface, however, it may be connected to the side of the slider 2 on which the low-resistance ceramic material is exposed by altering the position of the grounding electrode 91 as shown in FIG. 8. If the grounding electrode 91 on the floating wire 5B is connected to the slider 2 by way of a lead 8 as shown in FIG. 9, it is then possible to select the site for connection to the slider in a relatively free manner.

According to the third aspect of the invention, a flexible wire like the aforesaid floating wire 5B is used to connect the slider 2 to a ground, and so the displacement capability of the actuator 4 is hardly impaired upon the slider 2 connected to a ground. When the slider 2 is connected to a ground, it is not necessary to alter the structure of the actuator 4. As compared with other aspects, this aspect can be carried out with a more reduced number of steps and so is best suited for automation.

Figure 10:
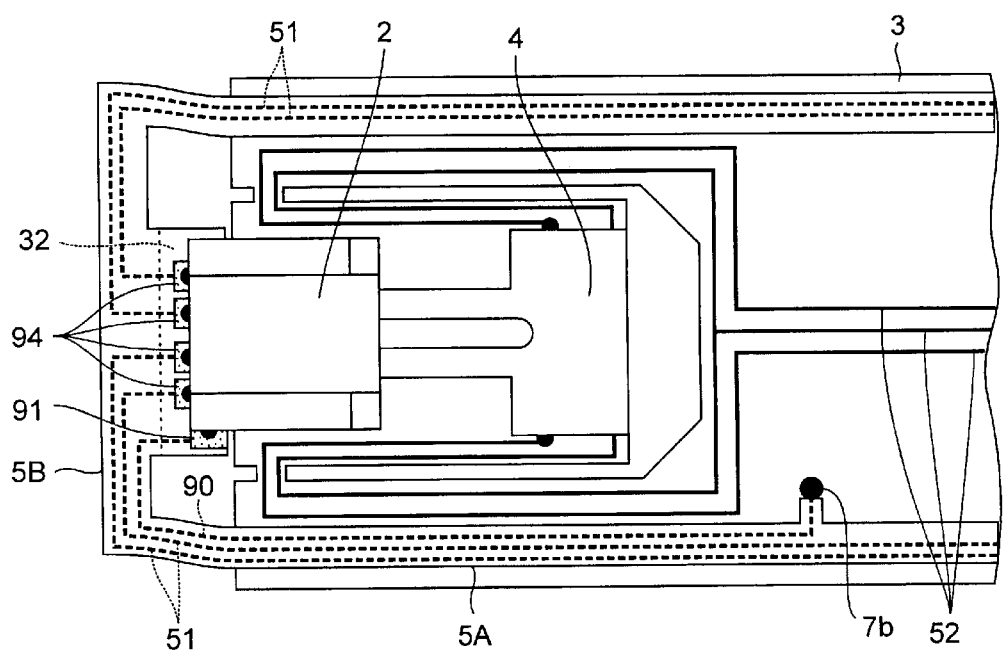
FIG. 10 is a plan view illustrative of a further exemplary arrangement of the magnetic head according to the third aspect, wherein the slider is mounted on the surface of the suspension opposite to the medium by way of the actuator.

Another exemplary arrangement of the third aspect of the invention is shown in FIG. 10. As shown in FIG. 10, a grounding wire 90 led out of a close-contact wire 5A is fixed at its end to a suspension 3 by means of an electrically conductive adhesive agent 7b. In this arrangement, the suspension 3 is made up of an electrically conductive material. Otherwise, the arrangement of FIG. 10 is the same as that of FIG. 8.

According to yet another arrangement of the third aspect of the invention, the close-contact wire 5A may be formed on the surface of the suspension 3 facing away from the medium. The floating wire 5B contiguous to this close-contact wire 5A is then allowed to go over the suspension 3 and terminate at the slider 2.

In the magnetic head according to the fourth aspect of the invention, a leading end portion of a suspension is curved or bent toward the side of the slider and has a flexible region that is movable and/or deformable in the displacement direction of a slider by an actuator. An interconnecting pattern located in close contact with the surface of the flexible region includes a wire for electrical connection to an electromagnetic transducer element and a grounding wire for electrical connection to the slider.

The magnetic head according to the fourth aspect of the invention may be fabricated by a process similar to that for the magnetic head according to the third aspect of the invention. Referring back to FIG. 7 illustrative of the third aspect of the invention, the terminal electrode sheet 32 is completely separate from the suspension 3. When the magnetic head according to the fourth aspect is fabricated, however, it is acceptable to bring the terminal electrode sheet 32 in partial contact with the suspension 3, thereby allowing the aforesaid interconnecting pattern to come in close contact with that area of partial contact. Then, the leading end portion of the suspension is curved or bent in such a way that the terminal electrode sheet goes over an actuator 4 and reaches a slider 2, as in the case of the terminal electrode sheet 32 shown in FIG. 7. For this arrangement, it is required that the leading end portion of the suspension be of rigidity low enough to be curved or bent as mentioned above and be movable and/or deformable in the displacement direction of the slider by the actuator. The flexible region having such low rigidity may be formed by etching both ends of the leading end portion of the suspension after the close-contact wire is formed as mentioned above. Alternatively, it is acceptable to use a suspension pre-configured to such a shape as having a leading end portion of reduced rigidity. In the fourth aspect of the invention, too, it is not an essential requirement to form the terminal electrode sheet 32 as in the case of the third aspect of the invention.

While explanation has been made with reference to the HDD magnetic head out of write/read heads, it is understood that the present invention may also be applied to an optical disk system. A conventional optical disk system makes use of an optical pickup comprising an optical module including at least a lens. This optical pickup is so designed that the lens can be mechanically controlled so as to be focused on the recording surface of the optical disk. In recent years, near field recording has been proposed to achieve ever-higher optical disk recording densities ("NIKKEI ELECTRONICS", 1997.6.16 (No. 691), page 99). This near field recording makes use of a flying head similar to that for a flying magnetic head. Built in this slider is an optical module comprising a hemispherical lens called a solid immersion lens or SIL, a magnetic field modulation recording coil, and a prefocusing lens. Another flying head for near field recording is disclosed in U.S. Pat. No. 5,497,359. With higher recording densities, such a flying head, too, is increasingly required to have higher tracking precision as in the case of an HDD magnetic head. Thus, the microdisplacement actuator is also effective for the flying head. Accordingly, the present invention may also be applied to such a write/read head (optical-head) for optical recording media.

More generally, the optical head to which the present invention can be applied comprises a slider similar to that in the aforesaid magnetic head, with an optical module built therein, or a slider which is in itself constructed of an optical module. The optical module comprises at least a lens, if required, with a lens actuator and a magnetic field generating coil incorporated therein. Such an optical head, for instance, includes not only a flying head for near field recording such as one mentioned just above but also an optical head wherein a slider is slidable on the surface of a recording medium, i.e., a pseudo-contact type or contact type optical head. To have an easy understanding of the case where the present invention is applied to the optical head, the electromagnetic transducer element in the foregoing explanation should be read as an optical head. It is understood that the present invention may be applied to a pseudo-contact type or contact type magnetic head as well.

Conceptually, the term "write/read head" used herein shall include a write/read head, a write-only head, and a read-only head. Likewise, the term "write/read system" used herein shall include a write/read system, a write-only system, and a read-only system. The term "recording medium" used herein, too, shall include a read-only type medium such as a read-only optical disk in addition to a recordable medium.

ADVANTAGES OF THE INVENTION

In the write/read head supporting mechanism of the invention, the slider can be connected to a ground without detriment to the displacement capability of the actuator, and so any electrostatic breakdown of the electromagnetic transducer element or optical module can be prevented without sacrificing their positioning precision.

What we claim is:

1. A write/read head supporting mechanism comprising:
   a slider including an electromagnetic transducer element or an optical module;
   a suspension for supporting the slider and including a ground region; and
   a microactuator having a fixed part and a movable part and being disposed between the slider and the suspension for displacing said slider,
   wherein at least a part of said microactuator includes an electrically conductive region, and the ground region of said suspension is electrically connected to said slider by said electrically conductive region of said microactuator, such that the slider is grounded so as to prevent an electrostatic breakdown of the electromagnetic transducer element or the optical module,
   wherein a ground electrode of said microactuator extending between said fixed part and said movable part is utilized as said electrically conductive region of the microactuator, and
   wherein the ground electrode of the microactuator on the side of the movable part is electrically connected to the slider, and the ground electrode on the side of the fixed part is electrically connected to the ground region of the suspension without any detriment to the displacement capability of the microactuator.

2. A write/read system comprising:
   a write/read head supporting mechanism including,
   a slider including an electromagnetic transducer element or an optical module,
   a suspension for supporting the slider and including a ground region, and
   a microactuator having a fixed part and a movable part and being disposed between the slider and the suspension for displacing said slider,
   wherein at least a part of said microactuator includes an electrically conductive region, and the ground region of said suspension is electrically connected to said slider by said electrically conductive region of said microactuator, such that the slider is grounded so as to prevent an electrostatic breakdown of the electromagnetic transducer element or the optical module,
   wherein a ground electrode of said microactuator extending between said fixed part and said movable part is utilized as said electrically conductive region of the microactuator, and
   wherein the ground electrode of the microactuator on the side of the movable part is electrically connected to the slider, and the ground electrode on the side of the fixed part is electrically connected to the ground region of the suspension without any detriment to the displacement capability of the microactuator.

* * * * *